April 13, 1971    E. A. BERRY ET AL    3,574,554
CONTROLLED RATE DISPENSER
Filed June 2, 1969    2 Sheets-Sheet 1

INVENTORS
EDWARD A. BERRY
LEROY D. BARTER
BY
ATTORNEY

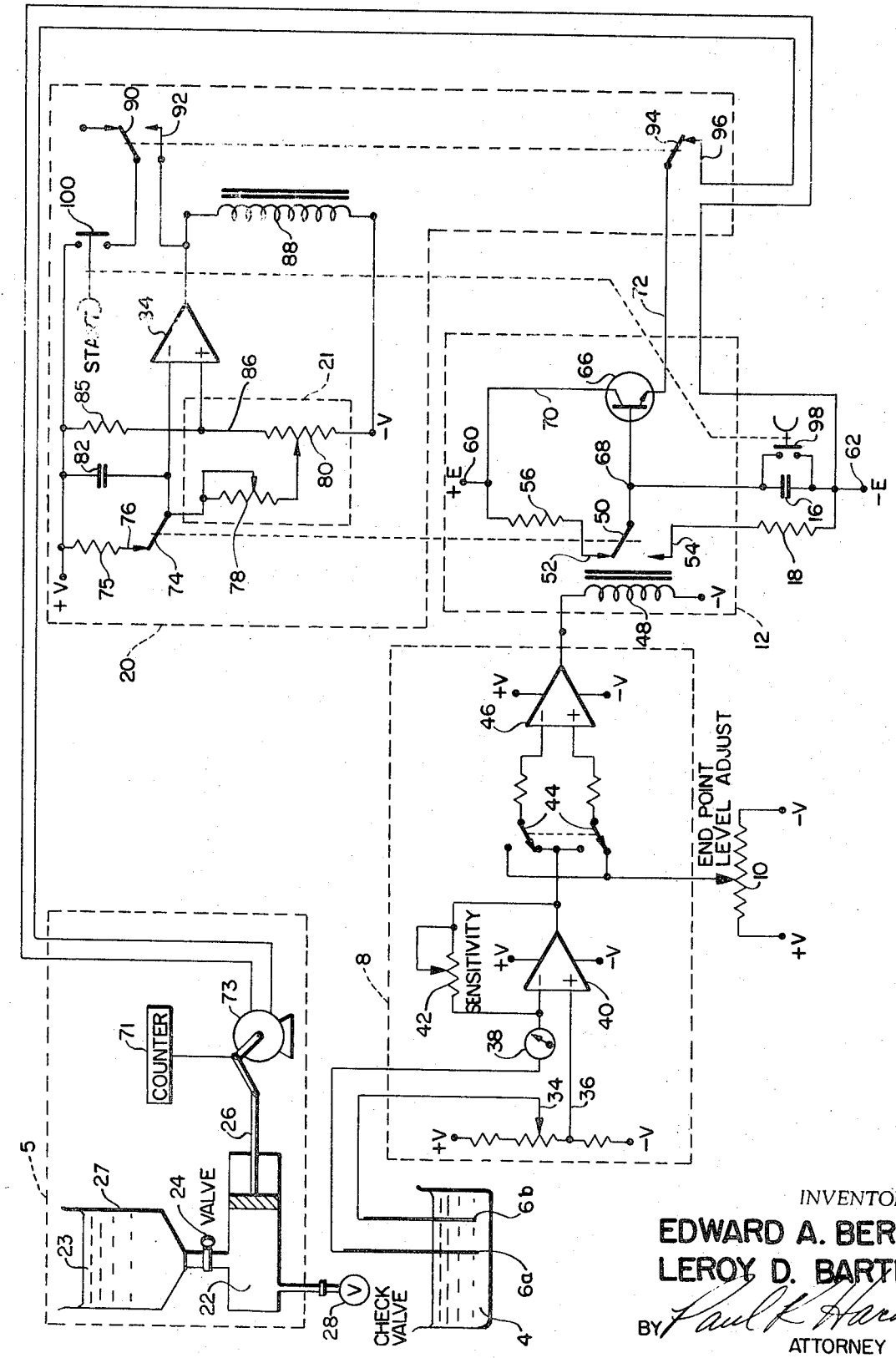

United States Patent Office 3,574,554
Patented Apr. 13, 1971

3,574,554
CONTROLLED RATE DISPENSER
Edward A. Berry, Arcadia, and Le Roy D. Barter, Fullerton, Calif., assignors to Beckman Instruments, Inc.
Filed June 2, 1969, Ser. No. 836,686
Int. Cl. G01n 31/18
U.S. Cl. 23—253                                         9 Claims

ABSTRACT OF THE DISCLOSURE

There is disclosed a dispensing apparatus having a controlled dispenser mechanism for adding a first substance to a second substance thereby forming a mixture at a rate determined by a preset mixture end point adjustment. A mixture sensor is connected to a comparator to produce a comparator output signal when the sensor signal exceeds a preset mixture end point level. The comparator output signal is connected to activate a switching device whereby the dispenser mechanism is disconnected from an activating source of energy and connected to an energy discharge device. An energy storage device is attached to the dispenser mechanism and by the activated switch device is connected to the energy discharge device to provide a decaying source of energy to the dispenser mechanism thereby slowing the dispensing rate. In response to the sensor signal dropping below the mixture end point, the source of energy is again connected by the switch device to the dispenser mechanism. A timed disconnect is connected to the comparator output and in response to the sensor signal exceeding the mixture end point level for a preset end point interval disconnects the dispenser mechanism from the switch device to end the dispensing action until reset for the next cycle.

---

This invention relates to an apparatus for dispensing a substance into a mixture at a controlled rate determined by a mixture end point adjustment and in particular to a titration system for controlling the rate of titrant addition to a sample solution from a motor driven positive displacement titrant dispenser.

The need for rapid and accurate dispensing of various types of substances is prevalent in analytical chemical systems. For example, quantitative analysis involves the accurately measured additions of known chemical solutions to a measured quantity of unknown sample mixture to produce a measured and controlled chemical reaction. By measuring the quantity of the known chemical solution added to produce a given end point chemical reaction in the unknown sample mixture, the quantities of various chemical constituents in the mixture can be determined. Since reaction end points can be quite elusive to precise and accurate determination if approached too slowly or too rapidly, a need is apparent for a high rate of known chemical reagent addition when starting and a slow rate when nearing the reaction end point.

A particular example of quantitative analysis well known in the art having a need for controlled dispensing is Karl Fischer titration. Here a Karl Fischer titrant, well known to the art, is added to the unknown sample mixture to determine the quantity of water in the sample. Sensor electrodes placed in the solution monitor the solution conductivity as a measure of the reaction end point. Quantities of measured titrant accurate to volumes as small as .01 milliliters are added until the electrode current exceeds a reference level typically of 1 microampere for an interval of time greater than one minute. The quantity in milliliters of titrant used to reach the end point is directly related to the milligrams of water present in the unknown mixture.

Various techniques are employed to dispense the titrant into the sample mixture. In one example a burette used to contain a titrant is fitted with a stop cock which is manually operated to admit to the unknown mixture a quantity of titrant measured by calibrated graduation marks on the burette. The end point is determined by observing the electrode current indicated by a meter and a stop watch to indicate the end point time interval. This manual technique is obviously slow and if the titrant is added too quickly can be inaccurate as well.

Another technique utilizes a control circuit connected to the electrodes inserted in the sample mixture to sense the current and actuate a relay to control a valve on the burette to permit a fixed rate of titrant flow into the sample mixture. A timer circuit is also utilized to measure the point at which the end point interval is reached. This fixed rate system is inherently slow if accuracy is desired since the rate of titrant addition when the valve is open must be restricted to a low level to prevent the end point from being exceeded before it can adequately be detected.

In order to obtain a more rapid titration and yet obtain the accuracy of the slower apparatus, another titration system functions with both a high and low titrant dispensing rate. Initially, the high rate is used; then, as the end point is approached, the system is switched to the low rate to obtain the required accuracy. The dispensing is accomplished by a relay operated valve driven by an operating pulse of fixed duration having a high frequency rate for high rate titrant dispensing and a low frequency rate for low rate titrant dispensing. Although faster than the fixed dispensing rate systems, the two rate system is still not as fast as desired in the art.

Further state of the art improvements in titrant dispensing have employed proportional control systems. Here a signal is generated composed of the difference between the electrode final end point signal level objective and the electrode signal from the sample solution. This signal is applied to a positive displacement dispenser such as a motor driven piston, controlling the rate of dispensing in proportion to the signal magnitude. Since the electrode signal is usually composed of discrete pulses of current in response to the discrete quantities of titrant added, as explained hereinafter, the signal must be integrated to provide a proportional control signal of a continuous nature. The system must be adjusted to obtain maximum rate with minimum overshoot. Additional refinements have included slope detection of the proportional signal to provide anticipation of the approaching end point thereby avoiding overshoot in obtaining high accuracy. Although the performance of a proportional system is satisfactory for the art, the cost is significantly high in relation to performance as compared to the other systems discussed hereinbefore.

Accordingly, it is the object of the present invention to provide a nonproportional dispensing system having the performance qualities of a proportional system for rapidly and accurately adding a substance to a mixture at a rate determined by a mixture end point adjustment.

Another object is to provide a titration system for controlling the discrete dispensing rate of a titrant into a sample solution in response to solution electrode current pulses exceeding a preset end point threshold level.

A further object of the present invention is to provide a continuous speed control for a motor driven positive displacement dispenser in a titration system having a noncontinuous ("on-off") solution end point signal indication.

These and other objects and many of the attendant advantages of this invention will readily be appreciated and better understood by reference to the following detailed discussion when considered in connection with the accompanying drawings wherein:

FIG. 2 illustrates a circuit diagram of a titration system constructed in accordance with the teachings of the present invention.

Figure 1:
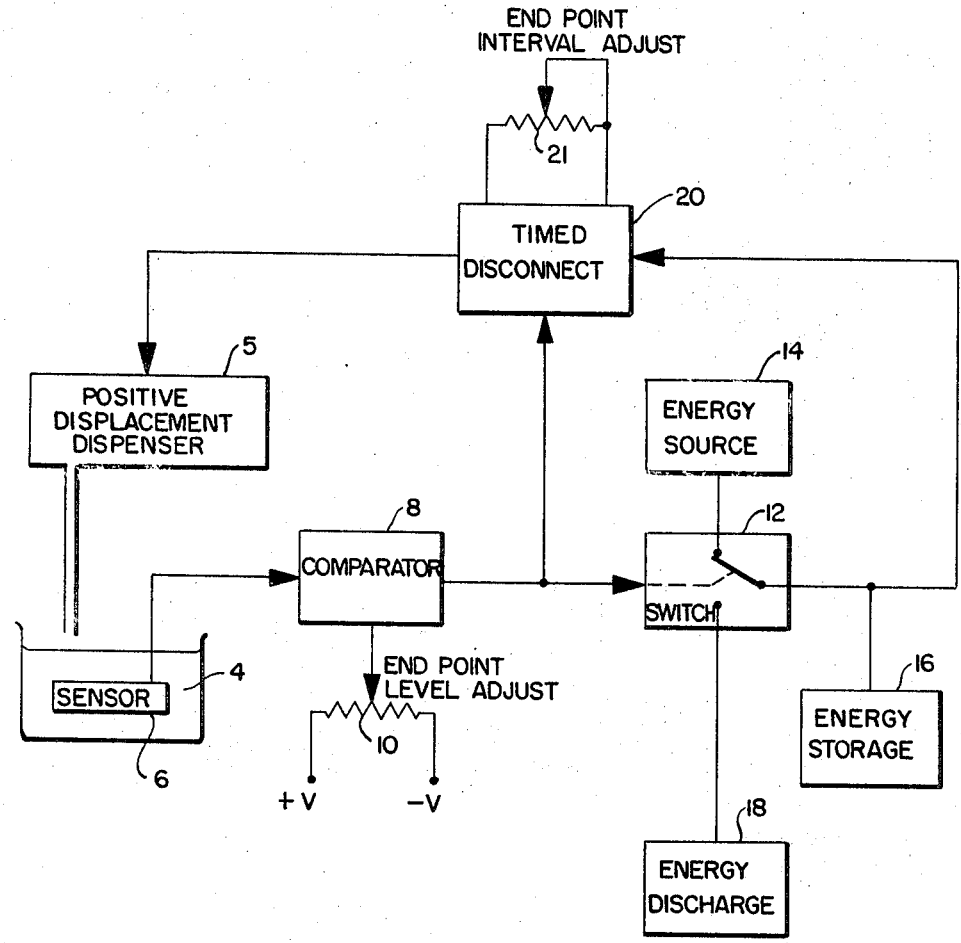
FIG. 1 is a block diagram of an exemplary controlled rate dispensing system constructed in accordance with the teachings of the present invention.

Referring now to FIG. 1, a positive displacement dispenser 5 adds a known quantity of a given substance into a mixture 4. A sensor 6 responsive to the mixture 4 is connected to the comparator 8 along with a mixture end point adjustment 10. The output of the comparator actuates a switch device 12 so as to disconnect energy source 14 from and connect energy discharge device 18 to the energy storage device 16 and the timed disconnect device 20 with end point interval adjust 21. The timed disconnect device output is connected to the positive displacement dispenser 5 and thereby completes the control loop for the dispensing system.

Referring now to FIG. 2, positive displacement dispenser 5 comprises stop cock valve 24 on reservoir 27 to allow titrant 23 to be admitted into cylinder 22. Piston 26 driven by motor 73 displaces the titrant in cylinder 22 through check valve 28 causing the titrant to enter sample solution mixture 4. A bias voltage contained in comparator 8 and appearing between lines 34 and 36 is applied between electrodes 6a and 6b producing a current which is indicated on meter 38 and applied to the operational amplifier 40 having a sensitivity control 42. The output of the operational amplifier and the end point adjustment 10 are connected by the double pole double throw switch 44 to the comparator amplifier 46. The output of the comparator amplifier is connected to relay coil 48 contained in switch device 12, relay coil 48 having an armature 50 normally connected to contact 52 and normally open to contact 54 and an armature 74 normally closed to contact 76 both armature 74 and contact 76 being within timed disconnect device 20. Connected to armature 50 is the base 68 of transistor 66 having a collector 70 and emitter 72. Connected between contact 52 and terminal 60 is charging resistor 56. Terminal 60 is connected to collector 70 and to one terminal of a source of energy comprising a +E voltage supply. Contact 54 is connected to a resistor comprising energy discharge device 18 which in turn is connected to terminal 62 to which the other terminal of the source of energy comprising a −E voltage supply is connected. Energy storage device 16 is a capacitor connected between the base 68 of transistor 66 and terminal 62. Across capacitor 16 is connected a push button shorting switch 98.

Armature 74 associated with relay coil 48 is connected to the inverting input of operational amplifier 84 and integrating capacitor 82 is connected between armature 74 and a +V terminal all contained within timed disconnect device 20. A current by-pass resistor 75 is connected between contact 76 and the +V terminal. Variable resistor 78 is connected between armature 75 and the variable tap of potentiometer 80. Variable resistor 78 and potentiometer 80 comprise end point interval adjust 21. Potentiometer 80 is connected between a noninverting input of amplifier 84 and a −V terminal. The bias resistor 85 is connected between the noninverting input of amplifier 84 and the +V terminal. The output of amplifier 84 is connected to relay coil 88 having an armature 90 and associated contact 92 and an armature 94 and associated contact 96. A normally shorting push button switch 100 is connected between the +V terminal and the armature 90. Armature 94 is connected to emitter 72 of transistor 66. The contact 96 is connected to motor 73. Motor 73 is also connected to terminal 62. The rotating armature of motor 73 is connected by mechanical linkage to piston 26 and also to counter 71.

Considering now the operation of the controlled dispensing system of FIG. 1, when the positive displacement dispenser 5 is activated a known quantity of a given substance is added to the mixture 4. At the point of addition in mixture 4, the added substance is at first highly concentrated and gradually diminishes in concentration as the substance diffuses and mixes throughout the mixture 4. Sensor 6 produces a signal output related to the presence of the added substance in the mixture 4. The sensor signal is compared in comparator 8 with an end point signal provided by the end point adjustment 10. When the sensor signal exceeds the end point signal, the comparator 8 produces an output signal. The comparator output signal actuates the switch device 12 which prior thereto was connecting the energy source 14 through the time disconnect device 20 to activate the dispenser 5. The actuation of switch device 12 by the comparator output signal causes the energy source to be disconnected and the energy discharge device 18 to be connected to energy storage device 16. Under this contition the energy being supplied to dispenser 5 is derived from the energy storage device 16. In addition to the energy being supplied to the dispenser the energy storage device 16 is further supplying energy through the energy discharge device 18. Therefore, since the rate of dispensing provided by the dispenser 5 is proportional to the energy supplied to it, the rate of dispensing will slowly decrease as the energy storage device 16 supplies its stored energy to the energy discharge device 18 and to the dispenser 5.

As the concentration of the substance added to the mixture 4 gradually diminishes at the point of addition, the sensor signal will drop below the end point signal removing the comparator output signal thereby causing the switch device 12 to again connect the energy source 14 through the time disconnect device 20 to the dispenser 5. The dispenser is then activated at its maximum rate until the added substance concentration in the mixture 4 again causes the sensor signal to exceed the end point signal and repeat the switching function described above.

Therefore, it can be seen that as the concentration of the substance added to mixture 4 increases, the time during which the sensor signal is less than the end point signal decreases. As a result, the average energy supplied to the dispenser decreases and the rate of dispensing is reduced. This controlled dispensing continues until such time as the sensor signal remains above the end point signal for a predetermined time interval known as the end point interval set by end point interval adjust 21. At this point, the time disconnect device 20 ends the dispensing process by removing all energy input to the dispenser 5. The end result is a mixture now containing the proper amount of substance added by dispenser 5 as predetermined by the end point adjust 10 and the time interval adjust 21.

Considering next the operation of the controlled dispensing rate titration system of FIG. 2, a titrant 23 contained in reservoir 27 is admitted into cylinder 22 by stop cock valve 24. The cylinder 22 comprises an accurately measured volume the titrant contents of which are displaced by piston 26 through check valve 28 into the sample solution mixture 4. Therefore an accurate measure of the volume of titrant added to the sample solution mixture 4 can be determined by the number of strokes of piston 26 counted by the counter 71 attached to the piston drive linkage. Each time the piston displaces the contents of the cylinder 22 the titrant added thereby to the sample solution mixture 4 creates at first a high conductivity in the solution which gradually diminishes as the titrant reacts with the solution. A bias voltage appearing between the leads 36 and 34 is applied between electrodes 6a and 6b to produce a current between the electrodes proportional to the solution conductivity. The electrode current is applied through the microammeter 38 to the inverting input of an operational amplifier 40. The operational amplifier has an output voltage proportional to the product of the electrode current and the variable sensitivity resistor 42. The output voltage of the operational amplifier is applied through a reversing switch 44 to one of the two inputs to a comparator amplifier 46. The other input to the comparator amplifier is connected to a reference voltage provided by the end point adjust 10. The reversing switch 44 enables the polarity of the comparator amplifier 46 to be reversed so as to be responsive to changes in electrode current produced either by direct titration or back titration which are techniques well known in the art. Although back titration and direct titration produce electrode current changes opposite in polarity, it is important to note that by switching the contacts of switch 44 the titration rate control system functions equally well for both techniques.

The comparator amplifier 46 produces an output signal whenever the output of the operational amplifier 40 exceeds the reference end point bias provided by end point adjust 10. This will occur whenever the conductivity of the sample solution mixture 4 exceeds that conductivity associated with the titration end point.

Figure 3:
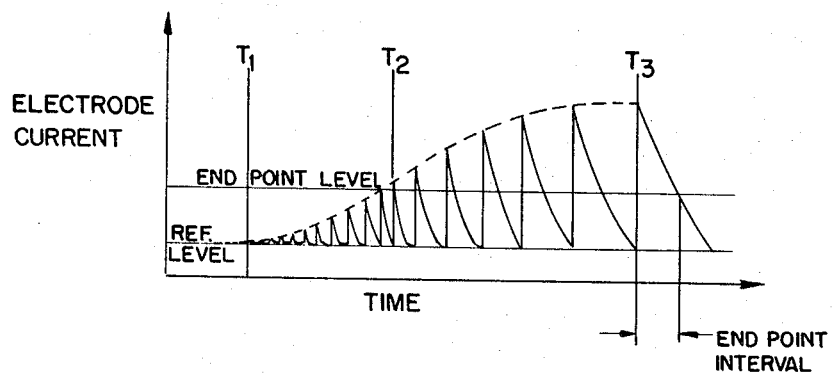
FIG. 3 illustrates the currents produced as a function of time from the electrodes used in the titration system of FIG. 2.

To further explain the type of current waveform produced between the electrodes 6 in the sample solution mixture 4, it is helpful to refer to the electrode current plotted as a function of time in FIG. 3. At time T1 titration is started and the first dispensing of titrant from cylinder 22 by piston 26 is performed. As the contents of cylinder 22 are dispensed into the solution, a small rise in electrode current is produced as illustrated by the pulse at T1. Titrant is dispensed from cylinder 22 by driving piston 26 at a maximum predetermined rate. Thus, each time the contents of cylinder 22 are dispensed into the sample solution mixture 4 an electrode current pulse is produced decaying as the sample solution reacts with the titrant to reduce the solution conductivity. Each time the contents of the cylinder 22 are emptied into the sample solution, the electrode current pulse produced is somewhat larger than the prior current pulse due to the cumulative effect of the titrant reacting with the sample solution mixture. This high rate of dispensing continues with each current pulse becoming larger until at T2 the current exceeds the end point level preset by the end point adjust 10. For the period of time that the pulse at time T2 exceeds the end point level, the comparator amplifier 46 produces an output signal into relay coil 48.

The signal applied to relay coil 48 causes the armature 50 to break contact with contact 52 and to make contact with contact 54. Therefore, the base current supplied from terminal 60 through resistor 56 to the base 68 of transistor 66 is removed and thereafter the base bias is supplied by the charge stored on capacitor 16 diminished by the current flow through parallel resistor 18. While the armature 50 was making contact with contact 52 the transistor 66 was biased in such a manner as to provide a sufficient voltage and current at emitter 72 so as to drive motor 73 at a predetermined maximum speed. When the armature 50 was switched to contact 54 the base bias is no longer supplied by resistor 56 connected to terminal 60 but must be supplied from capacitor 16 in parallel with resistor 18. Capacitor 16 can only supply the necessary base bias current at the expense of a drop of voltage proportional to the integral of the current flowing from the capacitor. This voltage drop is further enhanced by the current flow through resistor 18 in parallel with the capacitor. Nevertheless, if the time during which the pulse at T2 exceeds the end point level is quite short the voltage across capacitor 16 during this interval will change by a negligible amount and therefore the voltage and current supplied from emitter 72 to motor 73 will be essentially constant and nearly equivalent to the drive during the period T1 to T2.

However, as the electrode current pulses exceed the end point level by greater magnitudes, the period during which the pulse is greater than the end point level increases, thereby causing increased discharge from capacitor 16 resulting in increased voltage drops across the capacitor. Therefore, the drive to the motor supplied from the emitter of transistor 66 decreases and the motor speed decreases accordingly. In turn, the rate at which the cylinder 22 is discharged decreases, thereby increasing the time interval between the discrete titrant additions to the sample solution mixture 4 and the resulting electrode current pulses arising therefrom. The titration rate is gradually slowed by this process until the time T3 is reached.

As the titrant is discharged from cylinder 22 at time T3 the current pulse exceeding the end point level again causes the comparator 46 to produce a signal to activate relay coil 48. Also associated with relay coil 48 is the relay armature 74 normally engaged with contact 76. The comparator output signal applied to relay coil 48 causes armature 74 to break contact with contact 76 allowing capacitor 82 to begin to charge from the +V voltage through variable resistor 78 and a portion of potentiometer 80 to voltage −V. When the voltage at the now open armature 74 equals that at terminal 86 the comparator amplifier 84 produces an output signal to drive relay coil 88. The voltage at terminal 86 is determined by potentiometer 80 and resistor 85 connected between the +V and −V voltages. The initial voltage at the start of the current pulse at time T3 appearing at relay armature 74 is determined by resistor 75, variable resistor 78 and a portion of potentiometer 80. The charging rate of capacitor 82 is set by the combination of variable resistor 78 and potentiometer 80 thereby obtaining a wide variety of timed intervals known as end point intervals. Therefore, if the current pulse at T3 remains above the end point level for a time interval in excess of the end point interval determined by the capacitor 82 charging through variable resistor 78 and a portion of potentiometer 80, the comparator amplifier 84 will produce an output signal across relay coil 88. The activation of relay coil 88 causes armature 90 to make contact with contact 92 thereby latching relay 88 by applying the +V and −V voltage across the coil 88. In addition, relay armature 94 is caused to open contact 96 interrupting any further drive to motor 73 and thereby stopping the titration process. Until the start button 100 and start button 98 are manually depressed the system will remain inoperative by the latched relay coil 88 and its associated relay armatures and contacts. The start buttons 100 and 98 are coupled together so that capacitor 16 is simultaneously discharged with the removal of the voltage from relay coil 88. Therefore, if there is no electrode current above the end point level, by pressing the start button the system is reset and ready for a new titration.

It now should be apparent that the present invention provides a controlled rate, positive displacement dispenser system employing a minimum of active and passive components and which provides a rapid and accurate method of adding a substrate to a mixture to reach a desired mixture end point. Although the present invention provides a nonproportional ("on-off") method of control, it should be apparent that the results and performances are similar to that of a more expensive and complex proportional control system. Although particular components and circuit configurations have been discused in connection with the specific embodiment of the circuit constructed in accordance with the teachings of the present invention, others may be utilized. Furthermore, it will be understood that although an exemplary embodiment of the persent invention has been disclosed and discussed, other applications and circuit arrangements are possible and that the embodiment disclosed may be subjected to various changes, modifications and substitutions without necessarily departing from the invention.

What is claimed is:

1. An apparatus for adding a first substance to a second substance forming a mixture thereby at a rate controlled by a mixture end point preset into said apparatus comprising:

a mixture sensor means producing an output signal in response to a mixture of first and second substances;

mixture end point comparator means connected to said sensor means, said comparator means having a mixture end point adjustment and producing an output signal when said mixture sensor output signal exceeds said mixture end point adjustment;

positive displacement dispenser means for dispensing one of said substances, said dispenser having a dispensing rate proportional to energy transmitted to said dispenser means;

energy storage means connected to said dispenser means;

energy source means;

switch means connected between said dispenser means and said energy source means, said switch means connecting said dispenser means to said energy source means in the absence of said comparator output signal and disconnecting said dispenser means from said energy source means when said comparator output signal is present; and energy discharge means connected to said switch means, said switch means connecting said discharge means to said energy storage means in response to said comparator output signal and disconnecting said discharge means from said energy storage means in the absence of said comparator output signal.

2. The apparatus as defined in claim 1 further comprising:

preset timed end point disconnect means connected between said dispenser means and said switch means, said disconnect means responsive to said comparator output signal to disconnect said dispenser means from said switch means when the period of time said comparator output signal is present exceeds a time interval determined by said preset timed end point disconnect means.

3. A titration system for adding a titrant to a sample solution at a rate controlled by a preset solution end point comprising:

titrant dispensing means for dispensing titrant into a solution at a rate proportional to the amplitude of an input signal to said titrant dispensing means;

titration sensing means sensing the concentration of titrant in said solution and producing a signal proportional thereto;

comparator means connected to said titration sensing means and producing an output signal for a period of time equal to the time said proportional signal exceeds a preset level;

power supply means connected to said titrant dispensing means and to said comparator means for applying an input signal of fixed amplitude to said dispening means in the absence of an output signal from said comparator means, said power supply means including means for decreasing the amplitude of said input signal as a function of the time duration of said comparator output signal; and disconnect means connected to said power supply means for interrupting the output thereof and ending the titration cycle when the duration of said comparator output signal exceeds a preset interval of time.

4. The titration system defined in claim 3 wherein said titrant sensing means comprises:

a pair of electrodes immersed into said sample solution;

voltage bias means connected to said electrodes causing an electrode current to flow in response to the addition of said titrant; and electrode amplifier means connected to said electrodes to produce an output voltage proportional to said electrode current.

5. The titration system defined in claim 4 wherein said comparator means comprises:

a comparator amplifier having a first and second input and an output, said first input being connected to said electrode amplifier means output;

an adjustable end point voltage bias connected to said comparator amplifier second input, said comparator amplifier producing an output signal when said electrode amplifier output voltage exceeds said end point voltage bias; and a first relay connected to said comparator amplifier output, said first relay having an armature normally closed to a first contact and normally open to a second contact, said armature and said first and second contacts being connected to said power supply means.

6. The titration system defined in claim 5 wherein said disconnect means comprises:

timer circuit means connected to said comparator amplifier output, said timer circuit providing an output signal when the duration of said comparator amplifier output signal exceeds an end point time interval preset into said timer circuit; and a second relay connected to said timer circuit, said second relay having an armature normally closed to a first contact, said first contact being connected to said dispenser means and said armature being connected to said power supply means.

7. The titration system defined in claim 6 wherein said power supply means comprises:

a transistor emitter-follower amplifier having a base connected to said first relay armature, an emitter connected to said second relay armature, and a collector;

a voltage source having first and second terminals, said first terminal connected to said transistor emitter-follower collector;

a first resistor connected between said voltage source first terminal and said first relay first contact;

a second resistor connected between said first relay second contact and said voltage source second terminal;

a capacitor connected between said transistor emitter-follower base and said voltage source second terminal; and a manual discharge switch connected across said capacitor.

8. The titration system defined in claim 7 wherein said titrant dispensing means comprises:

a dispenser drive motor connected between said second relay first contact and said voltage source second terminal; and a titrant positive displacement dispenser actuated by said drive motor, said dispenser having a measured volume into which said titrant is admitted and said dispenser having a piston to dispense said titrant from said volume into said solution.

9. A circuit configuration for controlling the speed of a titrant dispenser motor responsive to a solution end point signal from a titration system said circuit comprising:

switching means actuated by said solution end point signal, said switching means having an armature normally connected to a first terminal and normally open to a second terminal;

a transistor emitter-follower amplifier having a base, emitter and collector terminal, said base terminal being connected to said switching means armature;

a power supply having a first and second terminal, said first terminal being connected to said transistor collector terminal;

a charging resistor connected between said power supply first terminal and said switching means first terminal;

a discharging resistor connected between said power supply second terminal and said switching means second terminal;

an energy storage capacitor connected between said transistor base terminal and said power supply second terminal; and a titrant dispenser motor connected between said transistor emitter terminal and said power supply second terminal.

References Cited

UNITED STATES PATENTS

| | | | |
|---|---|---|---|
| 2,770,531 | 11/1956 | Hawes et al. | 324—30X |
| 2,878,106 | 3/1959 | Malmstadt | 324—30X |
| 2,950,178 | 8/1960 | Halfter et al. | 23—253 |
| 3,073,682 | 1/1963 | Lindsley | 23—230A |
| 3,246,952 | 4/1966 | Dawe | 23—253 |
| 3,266,504 | 8/1966 | Sundstrom | 23—230X |

ROBERT B. REEVES, Primary Examiner

D. A. SCHERBEL, Assistant Examiner

U.S. Cl. X.R.

222—57; 324—30